US006250836B1

(12) United States Patent
Jurr et al.

(10) Patent No.: US 6,250,836 B1
(45) Date of Patent: Jun. 26, 2001

(54) TOLERANCE-COMPENSATION DEVICE

(75) Inventors: Richard Jurr, Weilmünster; Klaus Werner, Kronberg; Joachim Bandemer, Nidderau, all of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/232,035

(22) Filed: Jan. 15, 1999

(30) Foreign Application Priority Data

Jan. 29, 1998 (DE) ........................................ 198 03 261

(51) Int. Cl.[7] ........................................ F16B 2/02

(52) U.S. Cl. ........................ 403/13; 49/324; 411/553; 411/350; 403/350

(58) Field of Search ........................ 403/13, 14, 409.1, 403/374.1, 314, 350, 351, 352; 49/324; 411/553, 552, 551, 350, 555

(56) References Cited

U.S. PATENT DOCUMENTS

| | | | | |
|---|---|---|---|---|
| 2,306,952 | * | 12/1942 | Jones | 411/553 |
| 5,388,942 | * | 2/1995 | Bonacina et al. | 411/432 |
| 5,438,801 | * | 8/1995 | Ishihara et al. | 49/324 X |
| 5,567,100 | * | 10/1996 | Nakamura | 411/433 |

FOREIGN PATENT DOCUMENTS

| | | | | |
|---|---|---|---|---|
| 4107270 | | 9/1992 | (DE) . | |
| 573519 | * | 11/1945 | (GB) | 411/553 |

* cited by examiner

*Primary Examiner*—Lynne H. Browne
*Assistant Examiner*—John R. Cottingham
(74) *Attorney, Agent, or Firm*—Martin A. Farber

(57) ABSTRACT

Production-induced tolerances in the assembly of components involve very high outlay if, after the assembly, these components have to be located in a certain position in relation to one another. The novel tolerance-compensation device is intended to render the position of the components adjustable in relation to one another, assembly also being simplified.

13 Claims, 2 Drawing Sheets

TOLERANCE-COMPENSATION DEVICE

DESCRIPTION

1. Field and Background of the Invention

The invention relates to a tolerance-compensation device for the assembly of components.

DE 41 07 270 C2 discloses an automatic actuation device for a hinged vehicle window. An actuating lever, which is connected to the hinged window in order to open and close the same, is driven in this case by an actuating motor, via a flexible shaft. After the assembly of the hinged window with the actuating lever, the closed position of the hinged window has to correspond to a predetermined position. The correspondence of the closed position with the predetermined position is important since, on the one hand, in its closed position the hinged window must not compress the window seal to too pronounced an extent, in order to avoid damage to the window seal. On the other hand, the hinged window has to butt closely against the window seal in order to ensure sealing and in order to prevent unauthorized opening from the outside.

As a result of the abovementioned requirements which have to be met by the position of the hinged window when closed, and as a result of production-induced tolerances, the assembly of the hinged window with the actuating lever is very time-consuming.

2. Summary of the Invention

The object of the invention is to provide a tolerance-compensation device which ensures that, despite production-induced tolerances, components can be connected to one another in a defined manner. The tolerance-compensation device is intended to be of straightforward construction and to permit quick and reliable assembly.

The essential constituent parts of the tolerance-compensation device according to the invention are formed by two parts which are in engagement with one another and can be positioned as desired in relation to one another, preferably can be positioned as desired in the axial direction. Connected to each of these parts is a receiving means for the components which are to be connected. Upon assembly of the components, the two parts are positioned axially in relation to one another, in particular, such that the components can be connected via said tolerance-compensation device, the components then being located in their predetermined position. In order to fix this position over the long term, the two parts, once positioned, are secured, in particular secured radially and axially.

The advantage of the tolerance device resides in the fact that production-induced tolerances, upon assembly, can be compensated easily and quickly and the position of the components in relation to one another is no longer influenced by the assembly; rather the components which are to be connected can be brought into their predetermined position and assembled. Furthermore, assembly-induced stressing in the components is avoided.

The two parts may be of a wide variety of different designs. The essential factor is that the distance between the receiving means for the components which are to be connected can be adjusted, by it being possible for the two parts to be positioned as desired in relation to one another in the axial direction, and that the two parts can be secured in relation to one another in this position. This takes place, for example, in that the two parts have bores in which there are arranged fastening means for fixing the two parts axially. Said fastening means thus form a releasable connection.

Should this connection be non-releasable, riveting, adhesive bonding, welding or the like are possible.

In advantageous configurations of the invention, the two parts are designed as sleeves. At least one contour system is arranged in each sleeve. The contour systems are designed such that the distance between the bearing surfaces and base of a sleeve increases, or decreases, in the same direction of rotation. When the two sleeves are installed, then the contour systems of the two sleeves have to be designed such that the distance between the bearing surfaces and the base of one sleeve increases, while the distance between the bearing surfaces and the base of the other sleeve decrease in the same direction of rotation. Upon assembly, it is thus ensured that the contour systems of the two sleeves engage in one another. This achieves the situation where the sleeves move toward one another, or away from one another, when the sleeves are rotated with respect to one another.

With an arrangement of in each case three contour systems in a sleeve, tilting of the two sleeves is reliably avoided. However, upon interengagement, the lateral surfaces of the sleeves also sufficiently ensure against tilting to the extent where, in some circumstances, two contour systems or one contour system are/is sufficient.

The bearing surfaces may likewise be of a wide variety of different designs. In addition to a stepped arrangement or a toothing arrangement, the bearing surfaces may also be designed as inclined planes.

In further advantageous designs of the two parts, one part is designed as a sleeve and the other part is designed as a cylinder. The lateral surface of the cyclindrical part has at least one helically arranged groove, in which a corresponding mating element of the other part engages. It is also possible for the cylinder to be designed as a hollow cylinder and for the helical grooves to be arranged in the bore of the hollow cylinder. The two parts can be positioned axially in relation to one another by one part being rotated.

Depending on the respective design of the parts, or of the bearing surfaces, axial tolerance compensation can be carried out in one or any number of steps.

The two parts can be secured in a certain position in relation to one another by a multiplicity of means for frictionally locking and positively locking connections. Thus, for example, notches are arranged on the circumference of the contour systems of one part and have protrusions of the other part engaging therein. It is also possible for the two parts to be designed such that they can be secured by the internal/external toothing principle.

In a further advantageous configuration of the invention, markings are arranged on one or both parts, said markings indicating the respective arrangement of the two parts with respect to one another. The advantage of such a marking resides in the fact that, after dismantling, subsequent assembly is made simpler in that the arrangement of the two parts with respect to one another can be readjusted quickly and simply via the marking. Furthermore, it is also possible, in the case of initial assembly, for the tolerance-compensation devices to undergo preliminary adjustment by means of the marking.

The marking may be constituted by a color code, bores, beads, elevations or depressions and/or characters and symbols.

Such a tolerance-compensation device can be used to assemble preferably hinged windows, in particular hinged side windows for motor vehicles. A further possible application is in the assembly of components whose position in relation to one another varies as a result of tolerances, for example the fastening with tolerance compensation between a cockpit module and a load-bearing means (chassis, cross-member or the like).

BRIEF DESCRIPTION OF THE DRAWINGS

The invention is explained in more detail hereinbelow with reference to an exemplary embodiment. In the drawings.

DETAILED DESCRIPTION OF THE PREFERRED EMBODIMENTS

Figure 1:
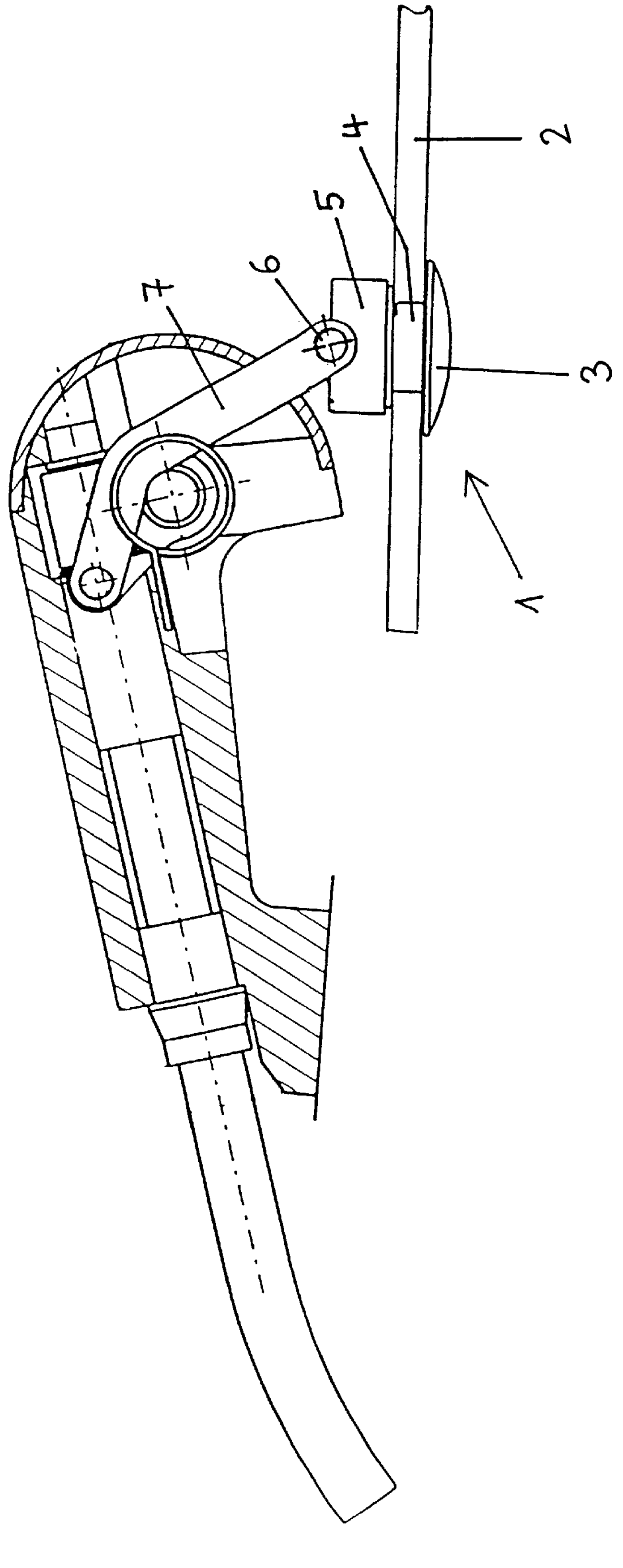
FIG. 1 shows a section through a tolerance-compensation device for connecting a hinged window to an actuating lever of a motor vehicle.

In FIG. 1, a stepped bolt 1 is arranged in a bore of a hinged window 2 such that the head 3 of the stepped bolt 1 butts against one side of the hinged window 2. A bottom sleeve 4 is arranged on the opposite side of the hinged window 2. The stepped bolt 1 and the bottom sleeve 4 form the receiving means for the hinged window 2 here. A top sleeve 5 is provided in relation to the bottom sleeve 4. The top sleeve 5 has a receiving means 6, on which there is fastened an actuating lever 7 of an actuating device (not illustrated any more specifically) for the hinged window 2. In this embodiment, the tolerance-compensation device can be used both for automatic and for manual actuating devices.

Figure 2:
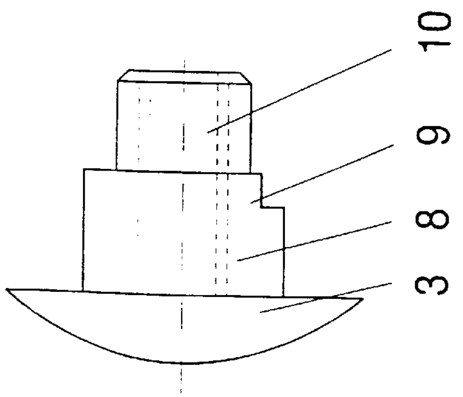
FIG. 2 shows a side view of a stepped bolt of the tolerance-compensation device.

The stepped bolt 1 illustrated in FIG. 2 has a head 3. The adjoining region 8 serves for receiving the hinged window 2. That end of said region 8 which is located opposite the head 3 has a flattened section 9. This means that the bottom sleeve 4 is received in a rotationally fixed manner. The stepped bolt 1 also has a bore 10 with internal threads, by way of which the bottom and top sleeve 4, 5 are connected to the stepped bolt 1 via a screw (not illustrated).

Figure 3:
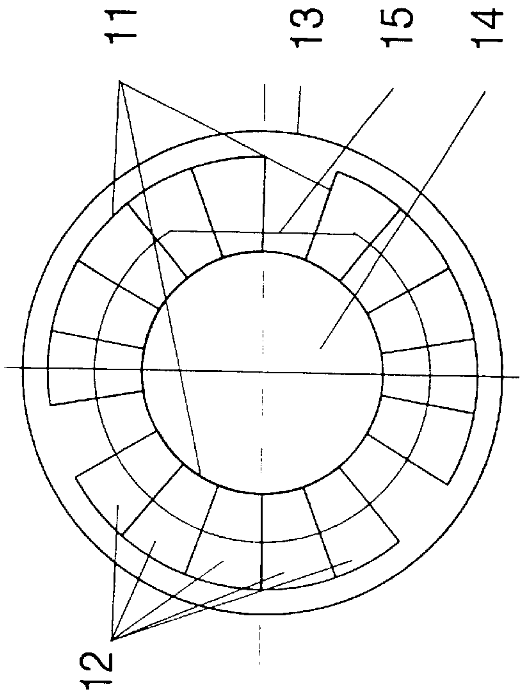
FIG. 3 shows a plan view of a bottom sleeve of the tolerance-compensation device.

The bottom sleeve 4 in FIG. 3 has three cutouts, which form the contour systems 11. These contour systems 11 are arranged radially at 120°-divisions and each comprises five steps 12. The distance between the steps 12 and the base 13 of the bottom sleeve 4 decreases in the positive direction of rotation. A bore 14 serves for receiving the stepped bolt 1. A recess 15, arranged with a flattened section in the base 13 of the bottom sleeve 4, forms the mating element for the region 9 of the stepped bolt 1.

Figure 4:
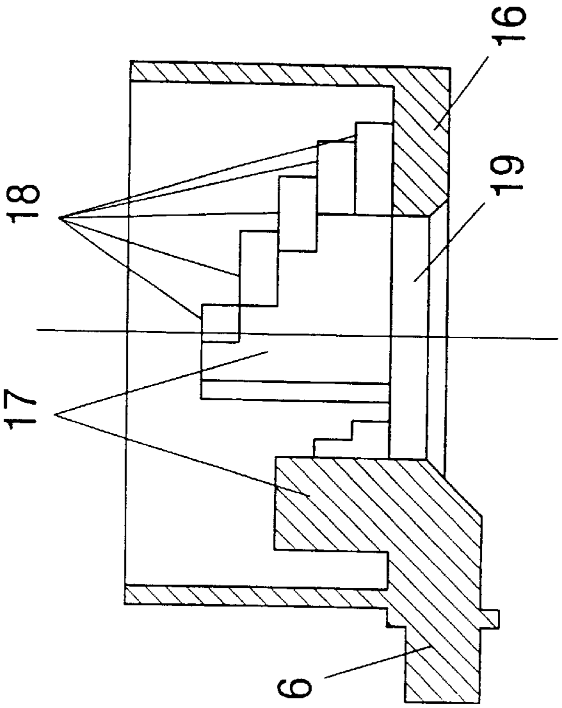
FIG. 4 shows a section through a top sleeve of the tolerance-compensation device.

The top sleeve 5 illustrated in FIG. 4 is of cup-like design. Three contour systems 17 each with 5 steps 18 are arranged radially at 120°-divisions on the base 16 of the top sleeve 5, the distance between the steps 18 and the base 16 increasing in the positive direction of rotation. The receiving means 6 for the actuating lever 7 is located on the base 16. The screw for connection to the stepped bolt 1 is arranged in a bore 19 in the base 16.

The means for securing the top sleeve 5 to the bottom sleeve 4 radially are not illustrated. A notch is arranged for each step 12 on the circumference of the bottom sleeve 4, a corresponding mating element arranged on the top sleeve latching into said notch.

LIST OF DESIGNATIONS

1. Stepped bolt
2. Hinged window
3. Head
4. Bottom sleeve
5. Top sleeve
6. Receiving means
7. Actuating lever
8. Region
9. Flattened section
10. Bore
11. Contour system
12. Step
13. Base
14. Bore
15. Recess
16. Base
17. Contour system
18. Steps
19. Bore

What is claimed is:

1. A tolerance-compensation device for connecting components, comprising:

receiving means, and at least two parts, wherein each part has at least one contour system comprising a succession of steps, wherein the parts are positionable in relation to one another by abutment or engagement of the steps of the contour system of one of said parts with the steps of a corresponding contour system of another of the parts; and wherein a first and a second of the parts are securable in relation to one another, the first and second parts being connected to the receiving means for respective ones of the components.

2. The tolerance-compensation device as claimed in claim 1, wherein said first and said second parts are positionable axially in relation to one another.

3. The tolerance-compensation device as claimed in claim 1, wherein said first and said second parts have bores for receiving fastening means for fixing said first and said second parts axially to each other.

4. The tolerance-compensation device as claimed in claim 1, wherein each of said first and said second parts comprises at least two additional contour systems.

5. The tolerance-compensation device as claimed in claim 1, wherein a first of the contour systems has a notch and a second of the contour systems has a corresponding element for mating with the notch.

6. The tolerance-compensation device as claimed in claim 1, wherein the contour systems have bearing surfaces configured as inclined planes.

7. The tolerance-compensation device as claimed in claim 1, wherein the contour systems have bearing surfaces configured as toothing arrangements.

8. The tolerance-compensation device as claimed in claim 1, wherein said first part is a cylinder having at least one groove on its circumference, the at least one groove being arranged helically, and wherein said second part has, as its contour system, shaped elements which engage in the at least one groove.

9. The tolerance-compensation device as claimed in claim 1, wherein said first part comprises a hollow cylinder, and wherein the contour system of the first part is arranged on an inner lateral surface of the hollow cylinder.

10. The tolerance-compensation device as claimed in claim 1, wherein, in order to secure said first and said second parts radially, the device comprises securing means arranged on circumferences of said first and said second parts or on the respective contour systems.

11. The tolerance-compensation device as claimed in claim 10, wherein the securing means comprise notches, bores or protrusions.

12. The tolerance-compensation device as claimed in claim 1, further comprises markings for indicating axial arrangement of said first and said second parts with respect to one another, the markings being arranged on one or both of said first and said second parts.

13. The tolerance-compensation device as claimed in claim 12, wherein the markings are constituted by any one of a color code, bores, beads, elevations or depressions, characters, and symbols.

* * * * *